United States Patent [19]

Vonderhaar et al.

[11] Patent Number: 4,742,841

[45] Date of Patent: May 10, 1988

[54] WATER SHUT-OFF VALVE

[75] Inventors: Douglas B. Vonderhaar, Highland; Donald E. McGeachy, Milford, both of Mich.

[73] Assignee: Numatics, Incorporated, Highland, Mich.

[21] Appl. No.: 37,023

[22] Filed: Apr. 10, 1987

[51] Int. Cl.⁴ ............................................. F16K 21/04
[52] U.S. Cl. ................... 137/115; 137/466; 137/512.5; 137/551
[58] Field of Search ............... 137/115, 460, 464, 465, 137/466

[56] References Cited

U.S. PATENT DOCUMENTS

| | | | |
|---|---|---|---|
| 2,013,846 | 9/1935 | Borel | 137/551 X |
| 3,476,133 | 11/1969 | Stedfeld | 137/115 |
| 4,446,890 | 5/1984 | Simpson | 137/464 X |
| 4,650,152 | 3/1987 | Doutt | 137/466 X |

FOREIGN PATENT DOCUMENTS 657783  9/1951  United Kingdom ................ 137/464

Primary Examiner—Robert G. Nilson
Attorney, Agent, or Firm—Barnes, Kisselle, Raisch, Choate, Whittemore & Hulbert

[57] ABSTRACT

A coolant system and control valve used in a circuit for cooling spot welding tips. The control valve normally passes coolant to and from the tips. Should a break in the coolant flow occur because of a breakdown of one or more of the tips, the control valve will shift to close the normal coolant loop and divert coolant from a pressure source to a tank until a repair is made. A switch indicator can be utilized for visual observation of a break and also a flow indicator is provided on the valve body to indicate normal coolant flow.

10 Claims, 3 Drawing Sheets

WATER SHUT-OFF VALVE

FIELD OF INVENTION

Cooling systems for spot welding tips with automatic shut-off in the event of tip loss or breakthrough which would cause coolant to be released.

BACKGROUND AND OBJECTS OF THE INVENTION

Many hundreds of spot welding tips, usually made of copper or a selected alloy, are used in manufacturing operations in the automotive and other industries. These tips are used frequently in production lines and in automatic machinery where many of the tips are not under the immediate surveillance of an operator. The tips must be cooled to operate properly and to prolong their life and this cooling is accomplished by directing a flow of coolant, usually water, into the interior of a tip where the flow is reversed to exit the tip. The tip is fitted to the welding tool by means of a taper fit.

The welding tips are subject to breakthrough by wear and erosion and also to loss by failure of the taper fit. With the usual coolant system, tip loss means that coolant will spray out over the machine and the floor until the flow is interrupted manually. It is an object of the present invention to provide a control valve for each tip or for a series of tips so that any line breakage in the system or any malfunction in a particular tip will result in immediate shut down of the coolant flow. An operator can then isolate the problem and replace a coolant conduit or a welding tip and restore the machine operation promptly.

Objects and features of the invention will be set forth in the following description and claims in which the principles of the invention are set forth together with details to enable persons skilled in the art to practice the invention, all in connection with the best mode presently contemplated for the invention.

BRIEF DESCRIPTION OF THE DRAWINGS

Drawings accompany the disclosure and the various views thereof may be briefly described as.

DETAILED DESCRIPTION OF THE INVENTION AND THE MANNER AND PROCESS OF USING IT

Figure 1:
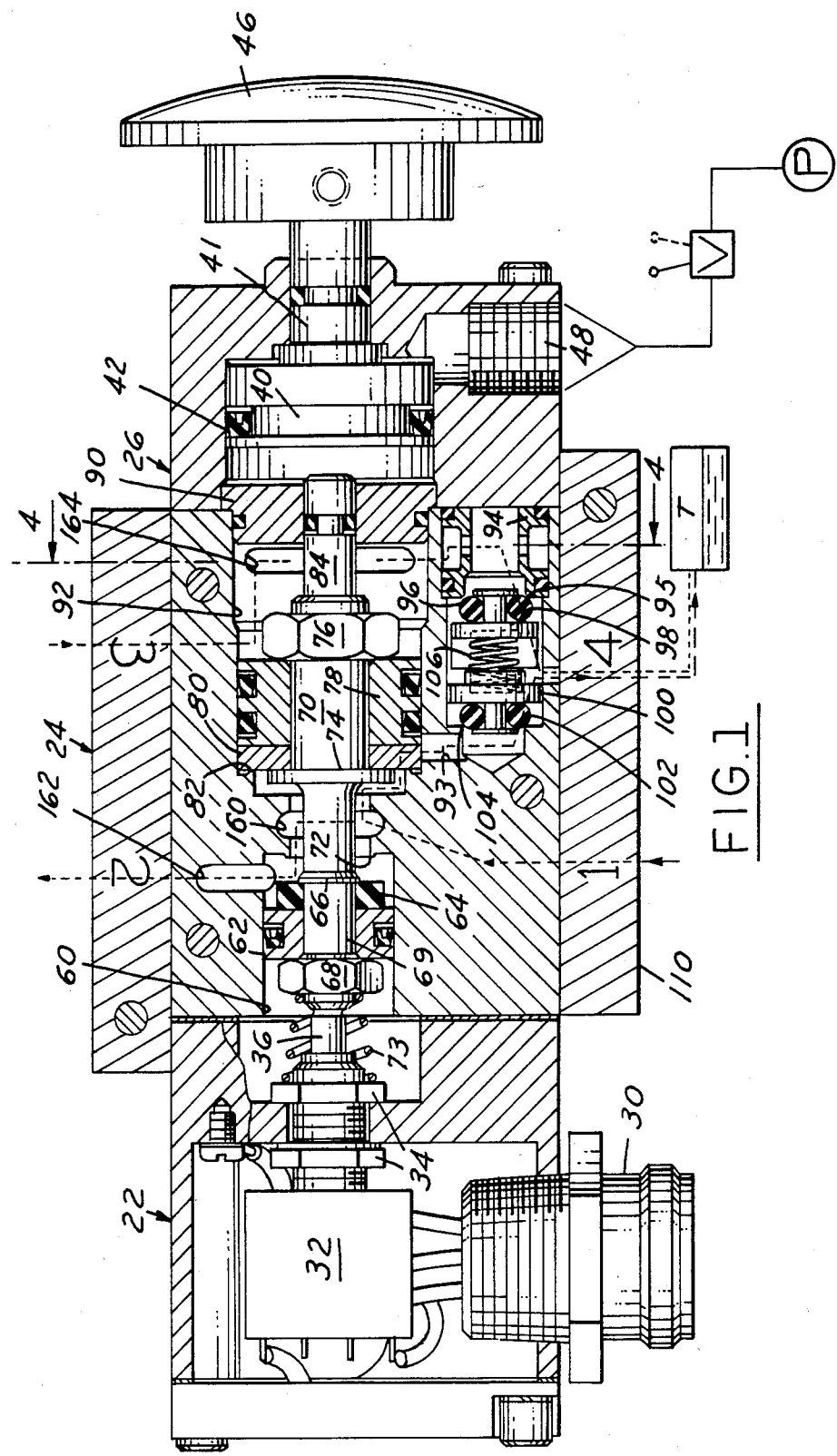
FIG. 1, a sectional view of a control valve constructed in accordance with the invention.

In FIG. 1, a valve assembly is illustrated composed of switch housing 22, a main valve housing body 24, and a manual override housing 26.

The switch housing, suitably bolted to main housing 24, has a side opening 30 for an electric connection to a switch 32. Nuts 34 provide a support for the switch 32 and a switch stem 36 to contact a valve spool end to be described.

The override housing 26 is also suitably bolted to the other end of valve housing 24 and has a cylindrical recess carrying a piston 40 with a seal 42. An actuating rod 44 also carrying a seal is secured to an override palm button 46. A port 48 is provided as a radial threaded bore in housing 26 to admit actuation pressure as an alternate to the manual override if desired.

The main valve body has a multi-diameter central bore coaxial with the switch stem 36 and the override piston 40. At the left end in the smallest working bore 60 is a piston assembly 62 adjacent a poppet seal 64 confined between a shoulder 66 and a nut 68 on the ensmalled end 69 of a valve shaft 70. The poppet seal 64 will cooperate with a valve seat 72 formed in the bore of the valve housing 24. A bias spring 73 bears on nut 34 and housing 22 and acts against nut 68 and shaft 70.

A second enlarged piston assembly is mounted on the valve spool 70 between a shoulder 74 and a nut 76 and consists of a double seal piston 78 and a poppet seal 80 which cooperates with a valve seat 82 in the valve housing 24. The seat 82 is considerably larger than the valve seat 72.

An ensmalled end 84 of the valve spool 70 has a sealed sliding fit in a ring insert 90 which is confined in the enlarged bore 92 between valve housing body 24 and end housing 26.

Below the main valve bore in housing body 24 is a small bore which carries a double check valve assembly. A passage 93 connects the main valve bore in the region of poppet seal 80 to one end of the small bore. At the other end of this small bore is a double ring insert 94 sealed in the bore having a central passage and a seat 95 at one end to cooperate with an O-ring 96 carried on a check valve 98. A second check valve 100 carries an O-ring seal 102 which functions in relation to a seat 104 at the left end of the small bore. The insert 94 has an outer groove open through radial passages to the central passage in the insert. A spring 106 is interposed between check valves 98 and 100. This spring 106 exerts a predetermined pressure on the flow in chamber 92 to maintain pressure in chamber 92 which is exerted on piston 78. The double check valves 98 and 100 prevent any back pressure in return header 122 from entering the valve.

Figure 2:
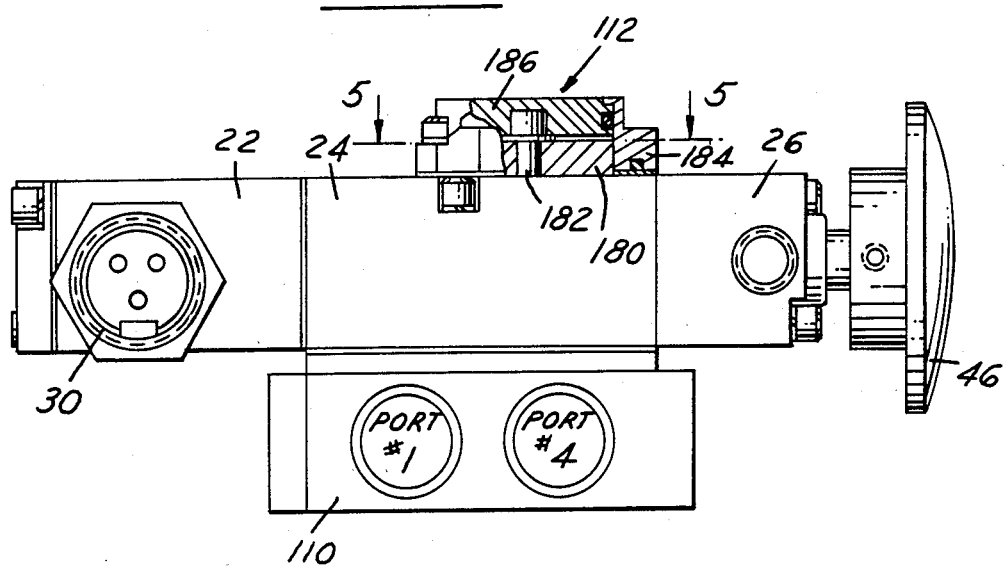
FIG. 2, a side elevation of the valve illustrating an indicator in a valve housing.

In FIG. 2, the housings 22, 24 and 26 are shown supported on a connector base 110. An indicator cap 112 to be described is mounted on the top of housing 24.

Figure 3:
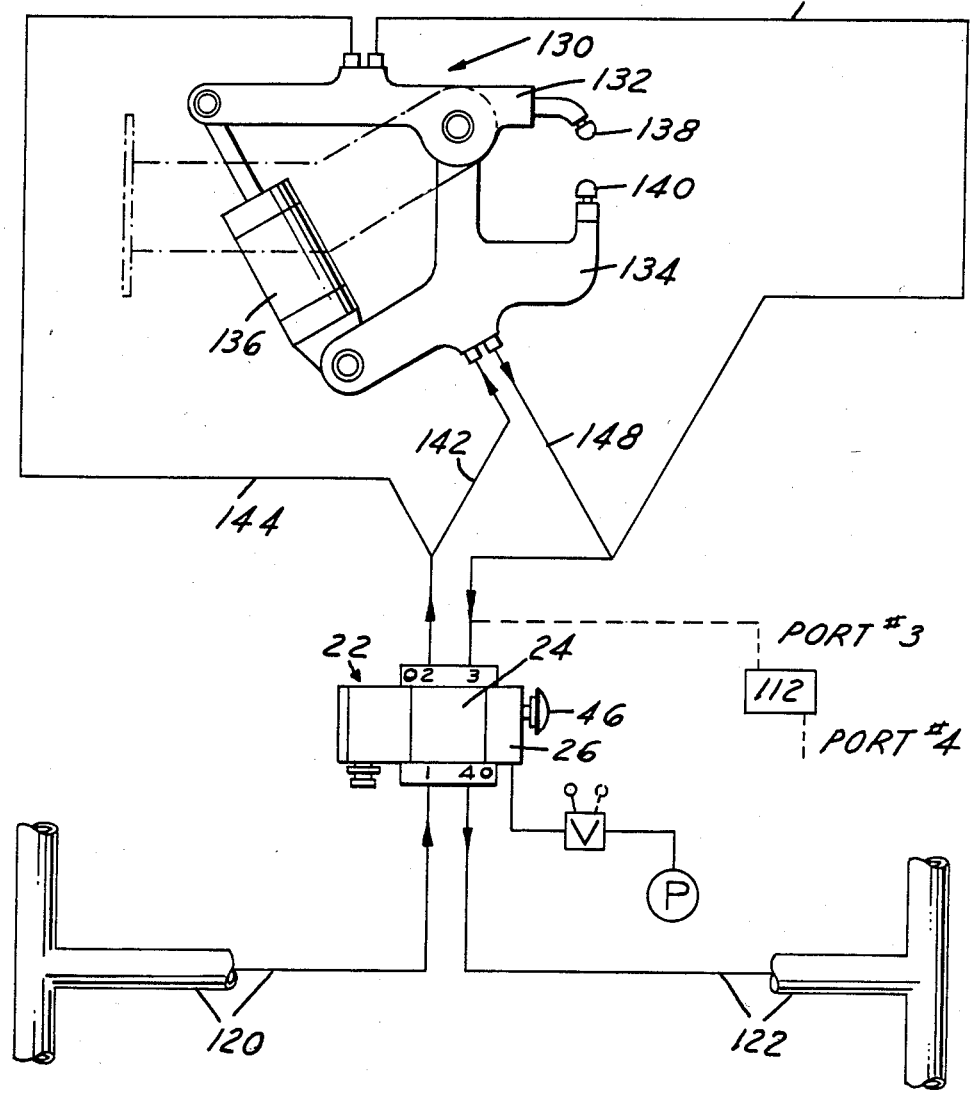
FIG. 3, a view of a spot welding fixture in a coolant control circuit.

In FIG. 3, a circuit schematic is depicted showing a water supply header 120, and a water return header 122. A spot welding tool is illustrated generally at 130 having jaws 132 and 134 which are actuated by pneumatic or hydraulic cylinder 136. Replaceable spot welding tips 138 and 140 are to be cooled by water flowing in the passages 142 and 144 from valve body 24 and flowing out passages 146 and 148 to the valve body 24 through mounting plate 110.

Reverting now to FIG. 1, there are four Ports designated 1, 2, 3 and 4 in base 110. In FIG. 2 Ports 1 and 4 are shown. Ports 2 and 3 will be on the opposite side of the base 110.

Figure 4:
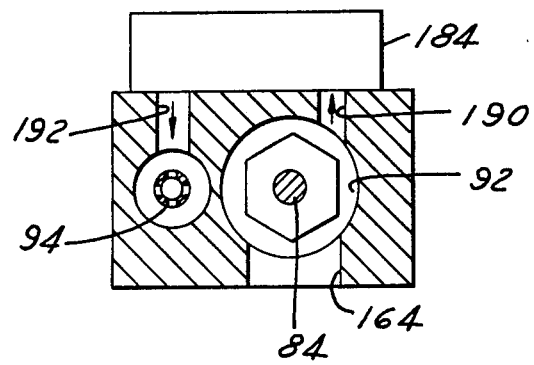
FIG. 4, a sectional view of the valve housing on line 4—4 of FIG. 1.

Port 1 in FIGS. 1 and 2 is connected to an annular groove 160 in body 24 which is positioned to the right of seat 72 around shaft end 69. Port 2 is connected to a passage 162 to the left of seat 72. Port 3 is connected to a passage 164 in the area of shaft portion 84 and continues through passage 190 (FIG. 4) to an indicator housing 112 and through passage 192 to the central passage in insert 94 to the right of seat 95. This flow causes the indicator, to be described below, to rotate and provide visual indication of flow. It will be noted also that when the poppet 98 is moved against the spring 106, Port 3 will be connected to tank Port 4. Similarly, if poppet seal 80 is moved off seat 82, then poppet seal 64 closes on seat 72 and passage 160 related to Port 1 will connect through passage 93 to the left end of the small bore adjacent O-ring seal 102 and seat 104. The shifting of poppet 100 against spring 106 will connect Port 1 to Port 4.

THE OPERATION

The shaft 70 is in an operating position where it would be moved either by the actuation of the palm button 46 or by pneumatic pressure from a pump P (FIG. 1) controlled by a valve V and introduced into port 48. In the position as shown, coolant water will enter Port 1 and pass through passages in the body 24 to port 160 around the shaft portion 69 to port 162 and then to Port 2 and on through conduits 142, 144 to the respective welding fixtures 132, 134 and replaceable tips 138, 140 in a closed loop. The return flow of the coolant will be through conduits 146, 148 to Port 3, and through passage 164 to chamber 92, around spool stem 84 and through passage 190 (FIG. 4) around indicator 180 through passage 192 to valve insert 94 where it will move check valve 98 to reach outlet Port 4 and reach the return header.

In the position shown in FIG. 1, the coolant pressure will act on piston 78 and piston 62 to maintain shaft 70 in the "coolant-flow" position to the left. The effective area of piston 78 on the right side and piston 62 on the left side overcomes the pressure on the left side of piston 78 at seat 82 and bias spring 73. Pressure in chamber 92 is due to the spring-backed exit check valve 98.

If a welding tip "blows", that is, leaks to cause the coolant pressure to drop, then the holding pressure in chamber 92 is relieved and pressure on the left side of piston 78 at seat 82 comes into play. Despite the circuit break, there will still be pressure in port 160 since one pressure source will usually be serving a number of welding fixtures. Since the area of seat 82 is greater than the area of piston 62, the valve spool will move to the right. As soon as pressure leaks past seat 82 to the entire effective area of piston 78, the piston will snap to the open position to the right. Immediately coolant fluid will pass from the chamber between pistons 62 and 78 to the passage 93 leading to the small bore housing check valve 100. At the same time, poppet seal 64 closes on seat 72 stopping flow through 162 to Port 2. Diverted flow will then pass the check valve and flow out of Port 4 to the return header 122.

The switch 32 can be used to show a signal indicating a flow diversion to the tank as a result of a tip "blow-out" so an operator can immediately replace the damaged tip and restart the coolant flow.

Figure 5:
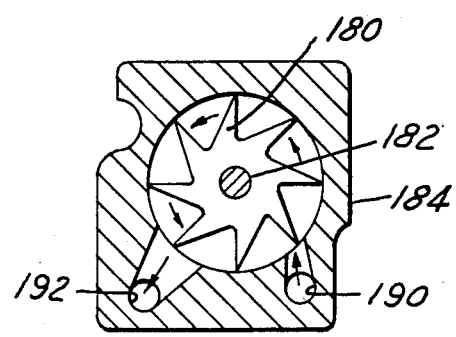
FIG. 5, a sectional view of a flow indicator on line 5—5 of FIG. 2.

A visual indicator housing 112 illustrated in FIG. 2 contains a spin wheel 180 rotatable on a pin 182 in housing 184 having a raised flanged wall which carries a transparent window 186 suitable sealed in the housing. The interior of the housing 184 is connected in series hydraulically between Port 3 and Port 4 (See FIG. 4) so that when coolant is flowing through the valve in the proper way, the spinner 180 (FIG. 5) affords a visual indication to an operator that proper flow is taking place.

To recapitulate, there is a closed circuit between the pressure source 120 and the return header 122, and return pressure to the header 122 is maintained in chamber 92 and exerted on the right side of piston 78 by check valve 98 so the area ratio is sufficient to hold the valve spool in the flow position during normal operation. In this operation, seat 72 is open and seat 82 is closed. When the coolant circuit is opened by a breakthrough, pressure in chamber 92 drops and the pressure on the left side of piston 78 in conjunction with the bias spring 73 will exert an opening pressure to move the spool to the right, closing seat 72 and opening seat 82. Full pressure on the entire area of the left side of piston 78 moves the spool rapidly to the right to cause by-pass flow through passage 93 which is now open to seat 82 because of the shifting of piston 78. By-pass flow from Port 1 now passes check valve 100 and goes to the return header 122 through Port 4.

What is claimed is:
1. In a coolant system for a welding apparatus,
 (a) a coolant circuit including a pressure source and a reservoir,
 (b) a valve housing in said circuit having two parallel passages, the first passage to pass pressure flow from said pressure source to said circuit, and the second passage to pass return flow from said circuit to said reservoir,
 (c) a valve element shiftable in said housing from a first position in which said first passage is open, to a second position in which said first passage is closed and pressure flow is by-passed to said reservoir through said second passage,
 (d) a spring-biased first means in said second return passage to maintain a back-pressure in said return passage when coolant is flowing in said circuit,
 (e) said valve element having opposed first and second pressure surfaces exposed respectively to pressure in said first passage and to said back pressure, said second surface having a larger effective area than said first surface,
  wherein loss of pressure in said second passage causes said pressure on said first surface to shift said valve to said second position by-passing pressure flow to said reservoir.
2. In a coolant system:
 (a) a coolant circuit including a pressure source and a reservoir,
 (b) a valve having two positions in said circuit having parallel passages, the first to pass pressure flow to said circuit, and the second to pass return flow to said reservoir,
 (c) first means to maintain back pressure in said return flow,
 (d) second means on said valve responsive to said back pressure to maintain the valve in a first position during normal coolant circuit flow, said means being responsive to a break in said coolant circuit to shift said valve to a second position to close said first parallel passage and interrupt flow to said circuit,
 (e) said second means comprising a valve spool in a valve body having a primary piston exposed on one side to said back pressure in said second parallel passage, and a first seat in said valve body on the other side of said primary piston having a diameter less than that of said piston and exposed to said first parallel passage,
  whereby when said back pressure is lowered by a circuit break, pressure at said seat will move said spool off said seat and full pressure on said piston will then move said valve rapidly to said second position.

3. A coolant system as defined in claim 2 in which said spool carrying a secondary piston to cooperate with a second seat in said valve body to close said first parallel circuit when said spool is shifted to said second position.

4. A coolant system as defined in claim 2 in which said first means comprises a valve bore in said body independent of said valve spool, and a by-pass passage in said body extending from said first parallel passage to said second parallel passage, said by-pass passage being closed on said primary piston in said first position and open by the shifting of said primary piston to said second position.

5. A coolant system as defined in claim 4 in which said valve bore in said body has passages leading to each end of said bore, a first passage being a portion of said second parallel passage, and a second passage being said by-pass passage, and a check valve in each end of said bore, said check valves being opposed by a common backing spring.

6. A coolant system as defined in claim 2 in which a switch means is located at one end of said spool responsive to the movement from said first to said second position.

7. In a coolant system for passing coolant to and from an object to be cooled in a circuit loop from a pressure source to a reservoir and responsive to loss of pressure in said loop to close flow from said source, a control valve which comprises:
(a) a valve body having a valve bore with a primary large bore and a secondary coaxial smaller bore,
(b) a valve spool movable in said bore having a primary piston in said large bore and a secondary piston in said smaller bore,
(c) a first passage formed in said valve body to conduct coolant flow from a pressure source to a coolant circuit loop,
(d) a first valve seat in said secondary bore positioned to be closed by said secondary piston in a first position of said valve spool and open in a second position of said valve spool,
(e) a second passage formed in said body to conduct coolant flow from a coolant circuit loop to a reservoir,
(f) a second valve seat in said primary bore positioned to be closed by one side of said primary piston in said second position of said valve spool and open in said first position of said valve spool,
(g) said second passage being open to a second side of said primary piston to exert a holding pressure on said valve spool during pressure flow in said circuit, and
(h) a by-pass passage in said body to conduct coolant pressure flow from said first passage to said reservoir when said valve spool is in said first position closing said first valve seat,
said valve spool being shiftable to said first position by pressure on said one side of said primary piston when pressure in said circuit loop and said second passage is reduced by loss of pressure due to leakage.

8. In a coolant system as defined in claim 7 which includes a check valve in said second passage to create back pressure against said primary piston during normal operation of said system.

9. A coolant system as defined in claim 7 in which a second bore is formed in said body having a seat at one end open to said second passage and a seat at the other end open to said by-pass passage, and a check valve at each end of said second bore, each being biased toward said respective seats by a common spring.

10. In a coolant system as defined in claim 7 in which a port in said by-pass passage is closed by said primary piston in said second position and open to said by-pass passage when said primary piston is in said first position.

* * * * *